United States Patent
Yoshida

(10) Patent No.: US 12,409,892 B2
(45) Date of Patent: Sep. 9, 2025

(54) SIDE SILL REINFORCEMENT STRUCTURE FOR ELECTRIC VEHICLE

(71) Applicant: Kobe Steel, Ltd., Kobe (JP)

(72) Inventor: Masatoshi Yoshida, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 301 days.

(21) Appl. No.: 18/251,956

(22) PCT Filed: Oct. 4, 2021

(86) PCT No.: PCT/JP2021/036637
§ 371 (c)(1),
(2) Date: May 5, 2023

(87) PCT Pub. No.: WO2022/113524
PCT Pub. Date: Jun. 2, 2022

(65) Prior Publication Data
US 2024/0017770 A1    Jan. 18, 2024

(30) Foreign Application Priority Data
Nov. 30, 2020    (JP) .................................. 2020-198777

(51) Int. Cl.
*B62D 21/15*    (2006.01)
*B60K 1/04*    (2019.01)
(Continued)

(52) U.S. Cl.
CPC .............. *B62D 21/157* (2013.01); *B60K 1/04* (2013.01); *B60L 50/66* (2019.02); *B62D 25/025* (2013.01);
(Continued)

(58) Field of Classification Search
CPC .. B62D 21/157; B62D 25/025; B62D 27/065; B62D 29/008; B60K 1/04;
(Continued)

(56) References Cited

U.S. PATENT DOCUMENTS 5,392,873 A * 2/1995 Masuyama ............. B60L 50/64
180/68.5
9,796,424 B2 * 10/2017 Sakaguchi ......... B62D 25/2036
(Continued)

FOREIGN PATENT DOCUMENTS

CN    209719744 U  * 12/2019 ........... B62D 21/157
CN    110803223 A  *  2/2020 ............... B60K 1/04
(Continued)

OTHER PUBLICATIONS

International Search Report issued Nov. 16, 2021 in PCT/JP2021/036637 filed on Oct. 4, 2021, 2 pages.

*Primary Examiner* — Jacob B Meyer
(74) *Attorney, Agent, or Firm* — Oblon, McClelland, Maier &Neustadt, L.L.P.

(57) ABSTRACT

A side sill reinforcement structure includes a battery unit for drive, a side sill extending in a vehicle front-rear direction on an outer side in a vehicle width direction of the battery unit, and a reinforcing member that connects the battery unit and the side sill. The reinforcing member includes a closed cross-sectional portion group having a first closed cross-sectional portion disposed on the innermost side in the vehicle width direction and a second closed cross-sectional portion disposed adjacent to the first closed cross-sectional portion. The first closed cross-sectional portion includes a first upper wall and a first lower wall. The second closed cross-sectional portion includes a second upper wall and a second lower wall. The thickness of the first upper wall is larger than the thickness of the second upper wall, and the thickness of the first lower wall is larger than the thickness of the second lower wall.

16 Claims, 8 Drawing Sheets

(51) Int. Cl.
*B60L 50/60* (2019.01)
*B62D 25/02* (2006.01)
*B62D 27/06* (2006.01)
*B62D 29/00* (2006.01)
*F16B 5/02* (2006.01)
*H01M 50/242* (2021.01)
*H01M 50/249* (2021.01)
*H01M 50/262* (2021.01)

(52) U.S. Cl.
CPC ......... *B62D 27/065* (2013.01); *B62D 29/008* (2013.01); *F16B 5/02* (2013.01); *H01M 50/242* (2021.01); *H01M 50/249* (2021.01); *H01M 50/262* (2021.01); *B60K 2001/0438* (2013.01); *H01M 2220/20* (2013.01)

(58) Field of Classification Search
CPC ... B60K 2001/0438; B60L 50/66; F16B 5/02; H01M 50/242; H01M 50/249; H01M 50/262; H01M 2220/20
See application file for complete search history.

(56) References Cited

U.S. PATENT DOCUMENTS

| | | | | |
|---|---|---|---|---|
| 9,987,913 | B2 * | 6/2018 | Hara | B62D 25/20 |
| 10,483,510 | B2 * | 11/2019 | Stephens | H01M 50/249 |
| 10,494,030 | B1 * | 12/2019 | Paramasivam | B60K 1/04 |
| 10,547,039 | B2 * | 1/2020 | Toyota | B60K 1/04 |
| 10,603,998 | B2 * | 3/2020 | Toyota | B60L 50/66 |
| 10,632,857 | B2 * | 4/2020 | Matecki | B60L 50/64 |
| 10,661,646 | B2 * | 5/2020 | Matecki | B60L 50/66 |
| 10,720,620 | B1 * | 7/2020 | Grace | H01M 50/244 |
| 10,886,513 | B2 * | 1/2021 | Stephens | H01M 50/224 |
| 11,088,412 | B2 * | 8/2021 | Matecki | H01M 50/204 |
| 11,155,150 | B2 * | 10/2021 | Stephens | B60K 11/02 |
| 11,211,656 | B2 * | 12/2021 | Matecki | H01M 50/271 |
| 11,214,137 | B2 * | 1/2022 | Stephens | B60L 50/66 |
| 11,351,851 | B2 * | 6/2022 | Feichtinger | B60K 1/04 |
| 11,688,910 | B2 * | 6/2023 | Stephens | B60L 50/64 |
| | | | | 429/96 |
| 12,233,700 | B2 * | 2/2025 | Caliskan | B62D 25/20 |
| 2010/0307848 | A1 * | 12/2010 | Hashimoto | B60K 1/04 |
| | | | | 180/68.5 |
| 2012/0121959 | A1 * | 5/2012 | Yamada | H01M 10/66 |
| | | | | 429/100 |
| 2015/0176673 | A1 * | 6/2015 | Kaneko | B62D 21/157 |
| | | | | 188/377 |
| 2016/0236713 | A1 * | 8/2016 | Sakaguchi | B62D 25/2036 |
| 2024/0017770 | A1 * | 1/2024 | Yoshida | B60L 3/0007 |

FOREIGN PATENT DOCUMENTS

| | | |
|---|---|---|
| JP | 2013-256265 A | 12/2013 |
| JP | 2015-74244 A | 4/2015 |
| JP | 2022143381 A * | 10/2022 |
| JP | 2024137286 A * | 10/2024 |

* cited by examiner

SIDE SILL REINFORCEMENT STRUCTURE FOR ELECTRIC VEHICLE

CROSS-REFERENCE TO RELATED APPLICATIONS

This is a national phase application in the United States of International Patent Application No. PCT/JP2021/036637 with an international filing date of Oct. 4, 2021, which claims priority of Japanese Patent Application No. 2020-198777 filed on Nov. 30, 2020, the contents of which are incorporated herein by reference.

TECHNICAL FIELD

The present invention relates to a side sill reinforcement structure for an electric vehicle.

BACKGROUND ART

Electric vehicles are required to have higher collision safety performance than general fuel driven vehicles from the viewpoint of battery protection. In an electric vehicle, in order to secure a cruising range, a battery is widely arranged on an entire underfloor surface of a vehicle interior in many cases, and thus high collision safety performance at the time of side collision (hereinafter, also referred to as side collision) is particularly required. That is, when an object such as a pole collides with a vehicle body side portion due to spinning of the vehicle body or the like, it is necessary to protect the battery and the vehicle interior without being damaged.

For example, JP 2015-74244 A and JP 2013-256265 A disclose a vehicle body lower structure capable of suppressing deformation of a vehicle interior and improving side collision performance of a vehicle body. In the vehicle body lower structure, in order to obtain high side collision performance, a reinforcing member is disposed under a columnar member on a vehicle body lower side portion referred to as a side sill to improve the side collision performance.

SUMMARY OF THE INVENTION

The structures of JP 2015-74244 A and JP 2013-256265 A are structures in which an extruded shape material reinforcing material is disposed under a side sill, and are structures intended to absorb energy at the time of side collision by using these. In these structures, the cross-sectional wall thickness of the extruded shape material constituting the reinforcing material is set to be the same in each part. However, in order to achieve both securing battery protection performance and reducing the weight of components, it is desirable to optimize the cross-sectional wall thickness of each part by utilizing the advantage of the extruded shape material. However, such a structure that take these into account are not found.

An object of the present invention is to efficiently improve battery protection performance in a side sill reinforcement structure for an electric vehicle.

The present invention provides a side sill reinforcement structure for an electric vehicle including: a battery unit for drive disposed in a vehicle interior lower portion of an electric vehicle; a side sill extending in a vehicle front-rear direction on an outer side in a vehicle width direction of the battery unit; and a reinforcing member configured to connect the battery unit and the side sill. The reinforcing member is an extruded material made of an aluminum alloy, and includes a closed cross-sectional portion group in which a plurality of closed cross-sectional portions are continuous in the vehicle width direction in a cross section perpendicular to the vehicle front-rear direction. The closed cross-sectional portion group includes a first closed cross-sectional portion disposed on an innermost side in the vehicle width direction and a second closed cross-sectional portion disposed adjacent to the first closed cross-sectional portion. The first closed cross-sectional portion includes a first upper wall and a first lower wall that extend in the vehicle width direction and are arranged to face each other while being separated from each other in a vehicle vertical direction. The second closed cross-sectional portion includes a second upper wall and a second lower wall that extend in the vehicle width direction and are arranged to face each other while being separated from each other in the vehicle vertical direction. A thickness of the first upper wall is larger than a thickness of the second upper wall, and a thickness of the first lower wall is larger than a thickness of the second lower wall.

According to this configuration, since the extruded material made of an aluminum alloy is adopted as the reinforcing member, the thickness can be partially changed. Accordingly, the thicknesses of the first upper wall and the first lower wall can be made larger than the thicknesses of the second upper wall and the second lower wall, respectively. In particular, since being disposed on the innermost side in the vehicle width direction in the closed cross-sectional portion group, the first closed cross-sectional portion is a closed cross-sectional portion closest to the battery unit. Furthermore, since extending in the vehicle width direction, the first upper wall and the first lower wall of the first closed cross-sectional portion are portions that receive a side collision load. Therefore, increasing the thickness of the portions efficiently can improve battery protection performance while suppressing an increase in weight and an increase in cost as compared with a case of adopting a reinforcing member having a uniform thickness. Here, the electric vehicle widely refers to a vehicle having a drive battery on the lower side of the vehicle interior. In addition, the battery unit is a unit including a battery and a battery case.

A thickness of the first upper wall may be 1.2 times or more a thickness of the second upper wall, and a thickness of the first lower wall may be 1.2 times or more a thickness of the second lower wall.

According to this configuration, it is possible to secure sufficient battery protection performance by specifically defining a necessary thickness.

The first closed cross-sectional portion may be joined to the battery unit by a bolt.

According to this configuration, since the first closed cross-sectional portion having a relatively large thickness is firmly joined to the battery unit by the bolt, high coupling rigidity can be secured.

The closed cross-sectional portion group may include a third closed cross-sectional portion disposed on an outermost side in the vehicle width direction and a fourth closed cross-sectional portion disposed on an inner side in the vehicle width direction adjacent to the third closed cross-sectional portion. The third closed cross-sectional portion may include a third upper wall and a third lower wall that extend in the vehicle width direction and are arranged to face each other while being separated from each other in the vehicle vertical direction. The fourth closed cross-sectional portion may include a fourth upper wall and a fourth lower wall that extend in the vehicle width direction and are arranged to face each other while being separated from each other in the vehicle vertical direction. A thickness of the third upper wall may be larger than a thickness of the fourth upper wall, and a thickness of the third lower wall may be larger than a thickness of the fourth lower wall.

According to this configuration, by improving the strength of the outermost portion (third closed cross-sectional portion) in the vehicle width direction first receiving deformation in the side collision, the peak value of the deformation load received at the initial stage of the side collision can be increased. When the peak value of the deformation load received at the initial stage of deformation is increased as described above, the load variation according to the progress of deformation can be suppressed, and the energy absorption efficiency can be improved.

A thickness of the first upper wall may be smaller than a thickness of the third upper wall, and a thickness of the first lower wall may be smaller than a thickness of the third lower wall.

According to this configuration, the first upper wall and the first lower wall do not become excessively thick, so that it is possible to suppress an excessive increase in weight. In addition, in the extruded material made of an aluminum alloy, when a significant difference is provided in thickness, there is a possibility that extrusion processing cannot be stably executed. Therefore, by providing the upper limit to the thickness as described above, the extrusion processing can be stably executed.

The third closed cross-sectional portion may be joined to the side sill by a bolt.

According to this configuration, since the third closed cross-sectional portion having a relatively large thickness is firmly joined to the side sill by the bolt, high coupling rigidity can be secured.

Each closed cross-sectional portion included in the closed cross-sectional portion group may include an upper wall and a lower wall that extend in the vehicle width direction and are arranged to face each other while being separated from each other in the vehicle vertical direction. Thicknesses of the upper wall and the lower wall may be sequentially decreased from an outer side to an inner side in the vehicle width direction excluding the first closed cross-sectional portion.

According to this configuration, since the deformation strength of the reinforcing member is sequentially lowered from the outer side to the inner side in the vehicle width direction in accordance with the deformation region being expanded in the vehicle width direction according to the progress of the side collision, the load according to the progress of the deformation can be further equalized. Therefore, energy absorption efficiency can be further improved. In addition, since the application is excluded with respect to the first closed cross-sectional portion, the first closed cross-sectional portion can be configured less likely to be deformed even when the region on the outer side in the vehicle width direction from the first closed cross-sectional portion is crushed. Therefore, higher battery protection performance can be secured.

The reinforcing member may include a lower side extending portion extending downwards the battery unit. A cross member extending in the vehicle width direction may be provided under the battery unit. The lower side extending portion may be joined to the cross member.

According to this configuration, when a side collision load is applied to the first closed cross-sectional portion, the load can be transmitted to the cross member through the lower side extending portion. Therefore, higher battery protection performance can be secured.

According to the present invention, battery protection performance can be efficiently improved in a side sill reinforcement structure for an electric vehicle.

MODE FOR CARRYING OUT THE INVENTION

Hereinafter, embodiments of the present invention will be described with reference to the accompanying drawings.

First Embodiment

Figure 1:
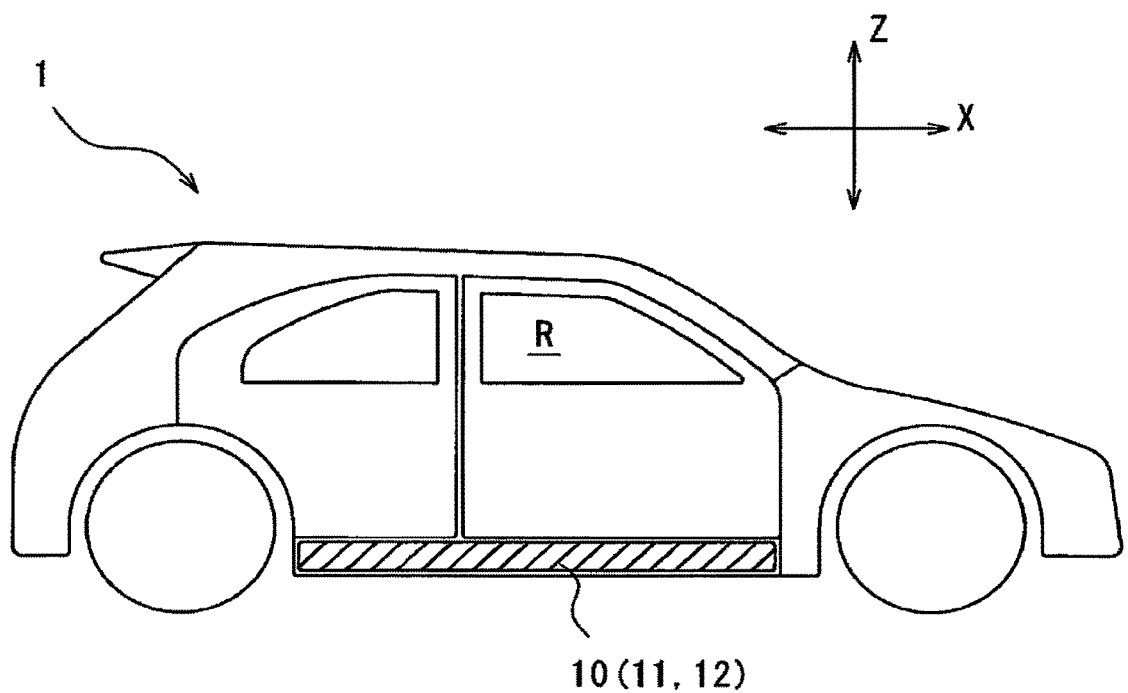
FIG. 1 is a side view of an electric vehicle.

Referring to FIG. 1, an electric vehicle 1 is a vehicle that travels by driving a motor (not shown) by electric power supplied from a battery 11. The electric vehicle 1 widely refers to a vehicle including a drive battery on the underside of the vehicle interior R, and can be, for example, an electric automobile, a plug-in hybrid vehicle, or the like. The type of the vehicle is not particularly limited, and may be a passenger car, a truck, a maintenance vehicle, other mobility, or the like. Hereinafter, as the electric vehicle 1, a side sill reinforcement structure for an electric automobile of the present embodiment will be described by taking a case of a passenger car type electric vehicle as shown in FIG. 1 as an example.

In FIG. 1, the front-rear direction of the electric vehicle 1 is indicated by an X direction, and the vertical direction is indicated by a Z direction. The same notation also applies to the subsequent figures, and the vehicle width direction is indicated by a Y direction in FIG. 2 and subsequent figures.

In the electric vehicle 1, the battery unit 10 is mounted on the substantially entire surface under the floor of the vehicle interior R at the central portion of the vehicle body. The battery unit 10 includes a drive battery 11 and a battery case 12 housing the battery 11.

Figure 2:
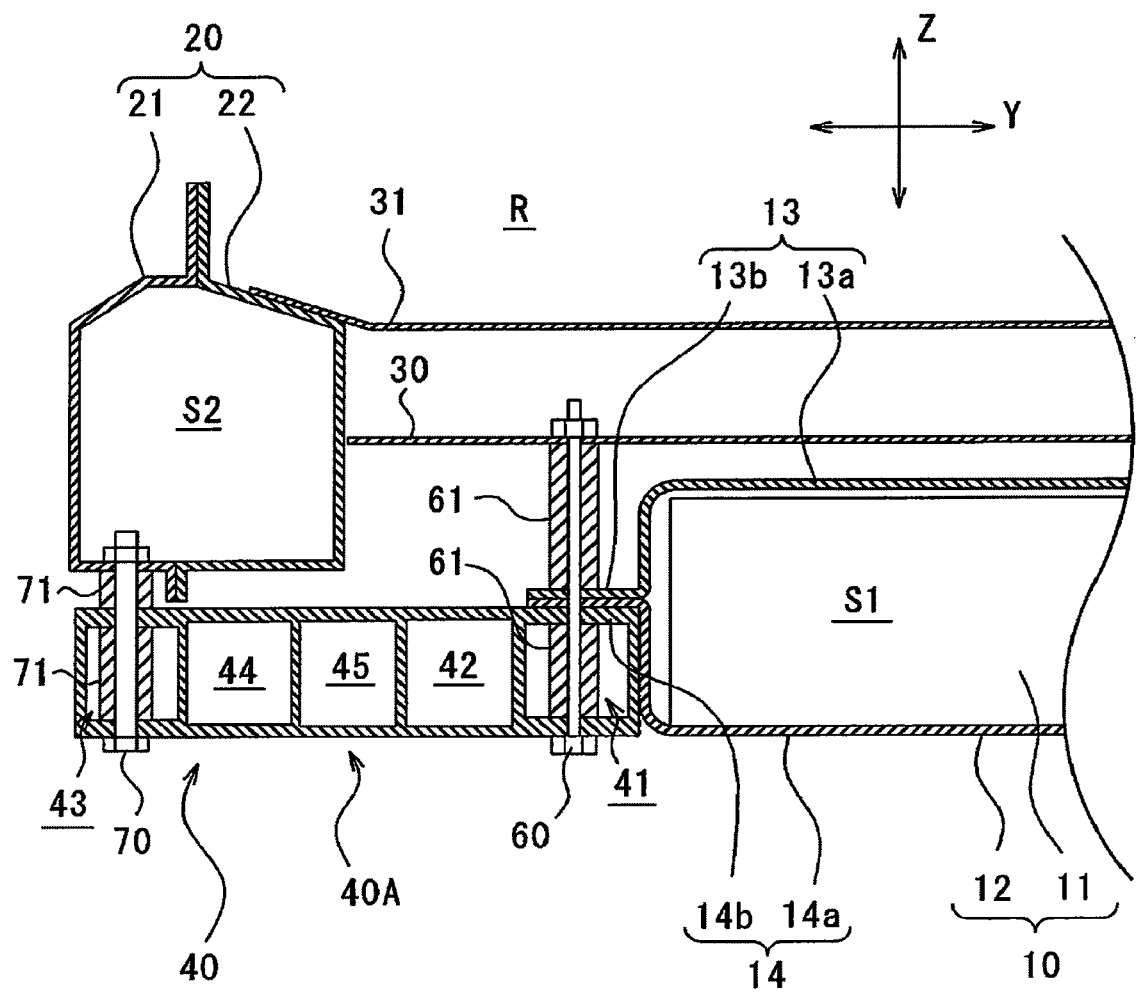
FIG. 2 is a cross-sectional view of a side sill reinforcement structure for an electric vehicle according to a first embodiment of the present invention.

Referring to FIG. 2, the battery case 12 includes an upper case 13 and a lower case 14. The upper case 13 includes a housing portion 13a having an upward-recessed shape and a flange portion 13b provided around the housing portion 13a in a plan view. The lower case 14 includes a housing portion 14a having a downward-recessed shape and a flange portion 14b provided around the housing portion 14a in a plan view.

The upper case 13 and the lower case 14 are joined by bonding the flange portions 13b and 14b. The battery 11 is housed in a housing space S1 defined by the housing portion 13a of the upper case 13 and the housing portion 14a of the lower case 14.

A hollow side sill 20 extending in the vehicle front-rear direction below the vehicle interior R is disposed on the outer side (left side in FIG. 2) in the vehicle width direction of the battery unit 10. The side sill 20 is a strength member constituting an outer side surface of a lower portion of the electric vehicle 1.

In the side sill reinforcement structure for an electric vehicle of the present embodiment, the side sill 20 includes an outer member 21 disposed on the outer side in the vehicle width direction and an inner member 22 disposed on the inner side in the vehicle width direction. Both the outer member 21 and the inner member 22 are formed by bending a sheet metal into a hat shape, and are bonded so as to form an internal space S2. The outer member 21 and the inner member 22 may be made of, for example, steel. Alternatively, the outer member 21 and the inner member 22 may be made of, for example, an aluminum alloy.

A floor panel 30 is disposed above the battery unit 10. The floor panel 30 is a plate material constituting a lower surface of the vehicle interior R. A cross member 31 extending in the vehicle width direction is disposed above the floor panel 30. Although not shown in detail, a plurality of cross members 31 are provided at intervals in the vehicle front-rear direction. The upper portions of a pair of side sills 20 provided on both outer sides of the vehicle interior R in the vehicle width direction are connected to each other by the plurality of cross members 31. It should be noted that in FIG. 2, only one of the pair of side sills 20 is shown.

A reinforcing member 40 made of an extruded material made of an aluminum alloy is disposed below the side sill 20. The reinforcing member 40 connects the battery unit 10 and the side sill 20.

The reinforcing member 40 extends in the vehicle front-rear direction along the side sill 20. The reinforcing member 40 has a closed cross-sectional portion group 40A in which a plurality of closed cross-sectional portions are continuous in the vehicle width direction in a cross section perpendicular to the vehicle front-rear direction.

In the present embodiment, the closed cross-sectional portion group 40A includes a first closed cross-sectional portion 41 disposed on the innermost side in the vehicle width direction (right side in FIG. 2) and a second closed cross-sectional portion 42 disposed adjacent to the first closed cross-sectional portion 41. In addition, the closed cross-sectional portion group 40A includes a third closed cross-sectional portion 43 disposed on the outermost side in the vehicle width direction (left side in FIG. 2) and a fourth closed cross-sectional portion 44 disposed adjacent to the third closed cross-sectional portion 43. In addition, the closed cross-sectional portion group 40A includes a fifth closed cross-sectional portion 45 disposed between the second closed cross-sectional portion 42 and the fourth closed cross-sectional portion 44. That is, the closed cross-sectional portion group 40A includes five closed cross-sectional portions 41 to 45 continuous in the vehicle width direction. The five closed cross-sectional portions 41 to 45 have rectangular shapes having substantially the same size.

Figure 3:
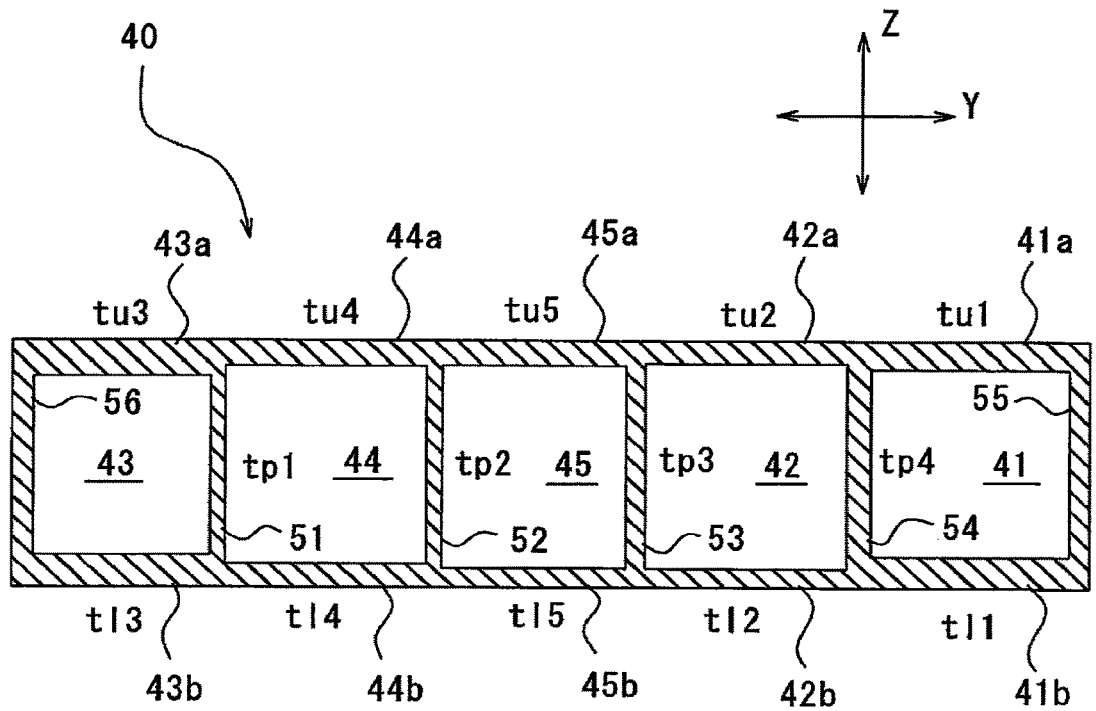
FIG. 3 is a cross-sectional view of a reinforcing member in FIG. 2.

Referring to FIG. 3, the first closed cross-sectional portion 41 includes a first upper wall 41a and a first lower wall 41b that extend in the vehicle width direction and are disposed to face each other while being separated from each other in the vehicle vertical direction. The first upper wall 41a is disposed on a relatively upper side, and the first lower wall 41b is disposed on a relatively lower side. The first upper wall 41a and the first lower wall 41b have the same thickness. However, the thicknesses of the first upper wall 41a and the first lower wall 41b may be different.

The second closed cross-sectional portion 42 includes a second upper wall 42a and a second lower wall 42b that extend in the vehicle width direction and are disposed to face each other while being separated from each other in the vehicle vertical direction. The second upper wall 42a is disposed on a relatively upper side, and the second lower wall 42b is disposed on a relatively lower side. The second upper wall 42a and the second lower wall 42b have the same thickness. However, the thicknesses of the second upper wall 42a and the second lower wall 42b may be different.

The third closed cross-sectional portion 43 includes a third upper wall 43a and a third lower wall 43b that extend in the vehicle width direction and are disposed to face each other while being separated from each other in the vehicle vertical direction. The third upper wall 43a is disposed on a relatively upper side, and the third lower wall 43b is disposed on a relatively lower side. The third upper wall 43a and the third lower wall 43b have the same thickness. However, the thicknesses of the third upper wall 43a and the third lower wall 43b may be different.

The fourth closed cross-sectional portion 44 includes a fourth upper wall 44a and a fourth lower wall 44b that extend in the vehicle width direction and are disposed to face each other while being separated from each other in the vehicle vertical direction. The fourth upper wall 44a is disposed on a relatively upper side, and the fourth lower wall 44b is disposed on a relatively lower side. The fourth upper wall 44a and the fourth lower wall 44b have the same thickness. However, the thicknesses of the fourth upper wall 44a and the fourth lower wall 44b may be different.

The fifth closed cross-sectional portion 45 includes a fifth upper wall 45a and a fifth lower wall 45b that extend in the vehicle width direction and are disposed to face each other while being separated from each other in the vehicle vertical direction. The fifth upper wall 45a is disposed on a relatively upper side, and the fifth lower wall 45b is disposed on a relatively lower side. The fifth upper wall and the fifth lower wall 45b have the same thickness. However, the thicknesses of the fifth upper wall 45a and the fifth lower wall 45b may be different.

The first to fifth closed cross-sectional portions 41 to 45 are partitioned by four partition walls 51 to 54 extending in the vehicle vertical direction. Specifically, the third closed cross-sectional portion 43 and the fourth closed cross-sectional portion 44 share the partition wall 51. The fourth closed cross-sectional portion 44 and the fifth closed cross-sectional portion 45 share the partition wall 52. The fifth closed cross-sectional portion 45 and the second closed cross-sectional portion 42 share the partition wall 53. The second closed cross-sectional portion 42 and the first closed cross-sectional portion 41 share the partition wall 54. The second closed cross-sectional portion 42 and the first closed cross-sectional portion 41 share the partition wall 54. The four partition walls 51 to 54 are arranged at equal intervals in the vehicle width direction.

An inner side wall 55 is disposed on the innermost side in the vehicle width direction of the reinforcing member 40. The inner side wall 55 is included in the first closed cross-sectional portion 41 and extends in the vehicle vertical direction so as to connect the inner ends in the vehicle width direction of the first upper wall 41a and the first lower wall 41b. In addition, an outer side wall 56 is disposed on the outermost side in the vehicle width direction of the reinforcing member 40. The outer side wall 56 is included in the third closed cross-sectional portion 43 and extends in the vehicle vertical direction so as to connect the outer ends in the vehicle width direction of the third upper wall 43a and the third lower wall 43b.

Referring to FIG. 2, the first closed cross-sectional portion 41 is joined to the battery unit 10 by a bolt 60. The bolt 60 extends in the vehicle vertical direction, penetrates the first upper wall 41a, the first lower wall 41b, the flange portion 13b of the upper case 13, the flange portion 14b of the lower case 14, and the floor panel 30, and joins them. The bolt 60 is preferably inserted and fastened from bottom toward top from the viewpoint of efficiency of battery replacement. In addition, in order to secure high joint strength, it is preferable to suppress deformation of the fastening portion of the bolt 60 using the cylindrical collar 61 covering the periphery of the bolt 60.

In addition, the third closed cross-sectional portion 43 is joined to the side sill 20 by a bolt 70. The bolt 70 extends in the vehicle vertical direction, penetrates the third upper wall 43a and the third lower wall 43b, and the outer member 21 of the side sill 20, terminates in the internal space S2, and joins them. Similarly to the above description, the bolt 70 is preferably inserted and fastened from bottom toward top, and it is preferable to use a cylindrical collar 71 covering the periphery of the bolt 70.

Referring to FIG. 3, the thickness tu1 of the first upper wall 41a is larger than the thickness tu2 of the second upper wall 42a (tu1>tu2). In addition, the thickness t11 of the first lower wall 41b is larger than the thickness t12 of the second lower wall 42b (t11>t12).

Preferably, the thickness tu1 of the first upper wall 41a is 1.2 times or more the thickness tu2 of the second upper wall 42a (tu1 1.2×tu2). Preferably, the thickness t11 of the first lower wall 41b is 1.2 times or more the thickness t12 of the second lower wall 42b (t11 1.2×t12). By specifically defining the required thickness in this manner, deformation of the innermost closed cross-sectional portion can be prevented even in consideration of material variations and the like, and sufficient battery protection performance can be secured.

The thickness tu3 of the third upper wall 43a is larger than the thickness tu4 of the fourth upper wall 44a (tu3>tu4). The thickness t13 of the third lower wall 43b is larger than the thickness t14 of the fourth lower wall 44b (t13>t14). Alternatively, the thickness tu3 of the third upper wall 43a may be the same as the thickness tu4 of the fourth upper wall 44a. In addition, the thickness t13 of the third lower wall 43b may be the thickness t14 of the fourth lower wall 44b.

Preferably, the thickness tu1 of the first upper wall 41a is smaller than the thickness tu3 of the third upper wall 43a (tu1<tu3). In addition, preferably, the thickness t11 of the first lower wall 41b is smaller than the thickness t13 of the third lower wall 43b (t11<t13). By defining in this manner, the first upper wall 41a and the first lower wall 41b do not become excessively thick, so that it is possible to suppress an excessive increase in weight. In addition, in the extruded material made of an aluminum alloy, when a significant difference is provided in thickness, there is a possibility that extrusion processing cannot be stably executed. Therefore, by providing the upper limit to the thickness as described above, the extrusion processing can be stably executed.

Any of the thicknesses tu2, tu4, and tu5 of the second, fourth, and fifth upper walls 42a, 44a, and 45a is the same (tu2=tu4=tu5). In addition, any of the thicknesses t12, t14, and t15 of the second, fourth, and fifth lower walls 42b, 44b, and 45b is the same (t12=t14=t15).

The thicknesses tp1 to tp4 of the partition walls 51 to 54 gradually increase from the outer side toward the inner side in the vehicle width direction (tp1<tp2<tp3<tp4). Accordingly, the degree of deformation can be equalized according to the progress of deformation of the reinforcing member 40 at the time of the side collision, and the energy absorption efficiency can be improved.

According to the side sill reinforcement structure for an electric vehicle of the present embodiment, the following action and effect are produced.

Since an extruded material made of an aluminum alloy is used as the reinforcing member 40, the thickness can be partially changed. Accordingly, the thickness tu1 of the first upper wall 41a can be made larger than the thickness tu2 of the second upper wall 42a (tu1>tu2), and the thickness t11 of the first lower wall 41b can be made larger than the thickness t12 of the second lower wall 42b (t11>t12). In particular, since being disposed on the innermost side in the vehicle width direction in the closed cross-sectional portion group 40A, the first closed cross-sectional portion 41 is a closed cross-sectional portion closest to the battery unit 10. Furthermore, since extending in the vehicle width direction, the first upper wall 41a and the first lower wall 41b of the first closed cross-sectional portion 41 are portions that receive a side collision load. Therefore, increasing in the thickness of the portion efficiently improves battery protection performance while suppressing an increase in weight and an increase in cost as compared with a case of adopting a reinforcing member having a uniform thickness.

In addition, since the first closed cross-sectional portion 41 having a relatively large thickness is firmly joined to the battery unit 10 by the bolt 60, high coupling rigidity can be secured.

In addition, the thickness tu3 of the third upper wall 43a is made larger than the thickness tu4 of the fourth upper wall 44a (tu3>tu4), and the thickness t13 of the third lower wall 43b is made larger than the thickness t14 of the fourth lower wall 44b (t13>t14). Accordingly, the strength of the outermost portion (third closed cross-sectional portion 43) in the vehicle width direction first receiving deformation in the side collision is improved, and the peak value of the deformation load received at the initial stage of the side collision is increased. When the peak value of the deformation load received at the initial stage of deformation is increased as described above, the load variation according to the progress of deformation can be suppressed, and the energy absorption efficiency can be improved.

In addition, since the first closed cross-sectional portion 41 having a relatively large thickness is firmly joined to the battery unit 10 by the bolt 60, high coupling rigidity can be secured.

In addition, since the third closed cross-sectional portion 43 having a relatively large thickness is firmly joined to the side sill 20 by the bolt 70, high coupling rigidity can be secured.

Second Embodiment

Figure 4:
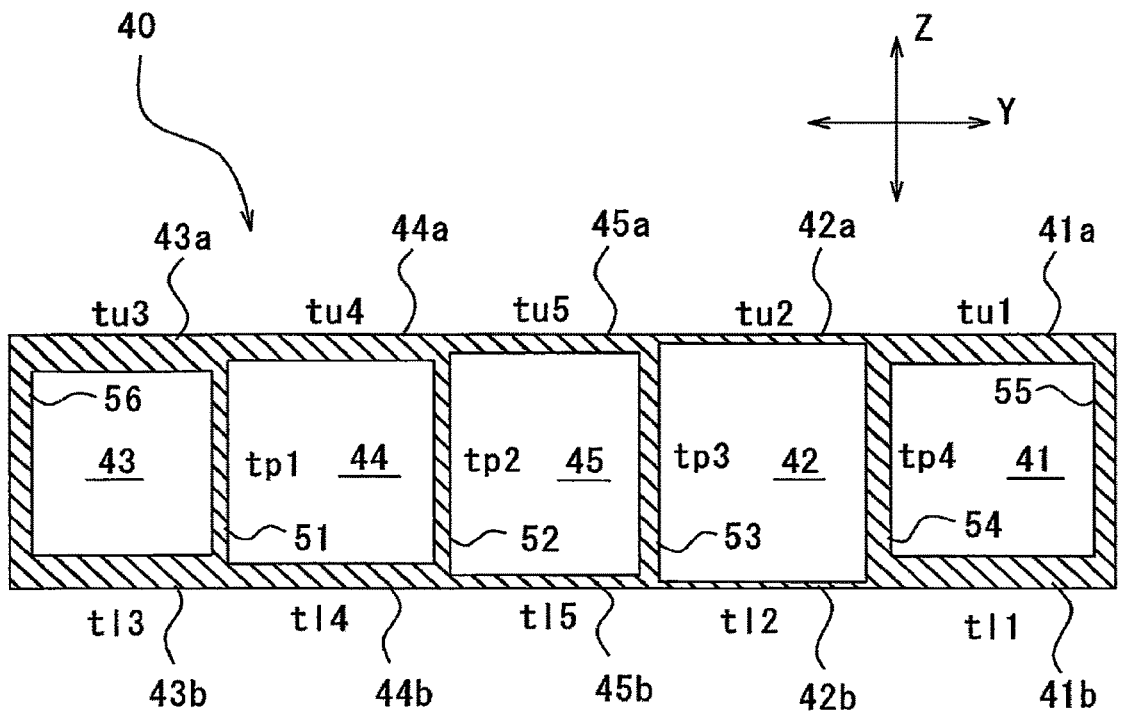
FIG. 4 is a cross-sectional view of a reinforcing member of a side sill reinforcement structure for an electric vehicle according to a second embodiment.

The reinforcing member 40 of the side sill reinforcement structure for an electric vehicle of the second embodiment shown in FIG. 4 is substantially the same as that of the first embodiment except for the thicknesses tu1 to tu5 of the first to fifth upper walls 41a to 45a and the thicknesses t11 to t15 of the first to fifth lower walls 41b to 45b. Therefore, the description of portions the same as those of the first embodiment may be omitted.

The thicknesses tu1 to tu5 of the first to fifth upper walls 41a to 45a and the thicknesses t11 to t15 of the first to fifth lower walls 41b to 45b sequentially decrease from the outer side to the inner side in the vehicle width direction except for the first closed cross-sectional portion 41 (the first upper wall 41a and the first lower wall 41b). That is, the thicknesses tu2 to tu5 of the second to fifth upper walls 42a to 45a sequentially decrease from the outer side to the inner side in the vehicle width direction (tu3>tu4>tu5>tu2). In addition, the thicknesses t12 to t15 of the second to fifth lower walls 42b to 45b sequentially decrease from the outer side to the inner side in the vehicle width direction (t13>t14>t15>t12).

In addition, the thickness tu1 of the first upper wall 41a is smaller than the thickness tu3 of the third upper wall 43a and larger than the thickness tu4 of the fourth upper wall 44a (tu4<tu1<tu3). The thickness t11 of the first lower wall 41b is smaller than the thickness t13 of the third lower wall 43b and larger than the thickness t14 of the fourth lower wall 44b (t14<t11<t13).

According to the side sill reinforcement structure for an electric vehicle of the present embodiment, since the deformation strength of the reinforcing member 40 is sequentially lowered from the outer side to the inner side in the vehicle width direction in accordance with the deformation region being expanded in the vehicle front-rear direction according to the progress of the side collision, the load according to the progress of the deformation can be further equalized. Therefore, energy absorption efficiency can be further improved. In addition, since the application is excluded with respect to the first closed cross-sectional portion 41, the first closed cross-sectional portion 41 can be configured less likely to be deformed even when the region on the outer side in the vehicle width direction from the first closed cross-sectional portion 41 is crushed. Therefore, higher battery protection performance can be secured.

Third Embodiment

Figure 5:
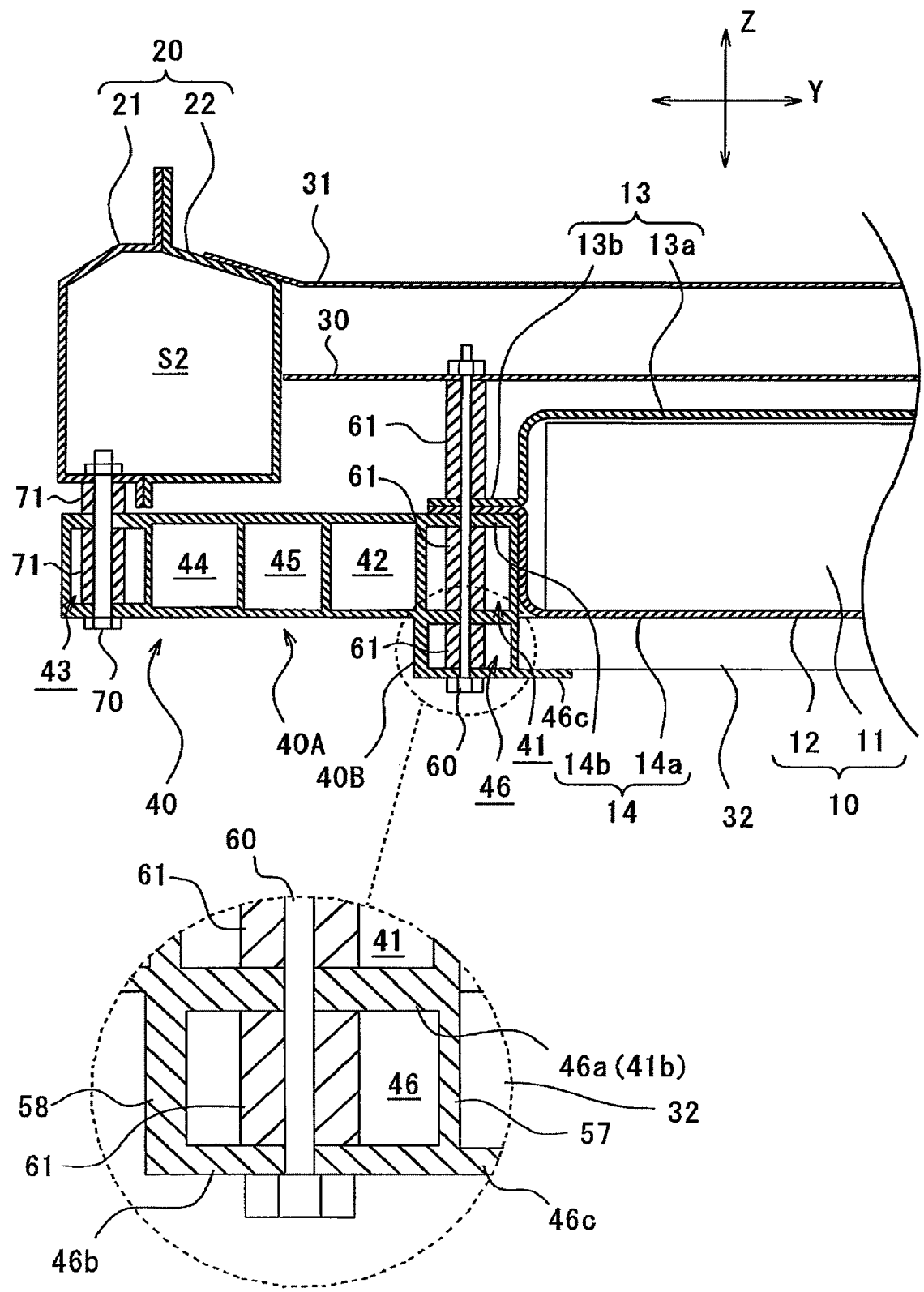
FIG. 5 is a cross-sectional view of a side sill reinforcement structure for an electric vehicle according to a third embodiment.

The side sill reinforcement structure for an electric vehicle of the third embodiment shown in FIG. 5 is substantially the same as that of the first embodiment except for the configuration related to the reinforcing member 40. Therefore, the description of portions the same as those of the first embodiment may be omitted. It should be noted that in FIG. 5, a portion indicated by a broken line circle is shown in an enlarged manner.

In the present embodiment, the reinforcing member 40 has a lower side extending portion extending downward from the battery unit 10. The lower side extending portion 40B extends downward from the first closed cross-sectional portion 41. In a cross section perpendicular to the vehicle front-rear direction, the lower side extending portion 40B includes a sixth closed cross-sectional portion 46 having a rectangular shape.

The lower side extending portion 40B includes, so as to constitute the sixth closed cross-sectional portion 46, an inner side wall 57 and an outer side wall 58 extending in the vehicle vertical direction, and a sixth upper wall 46a and a sixth lower wall 46b connecting the inner side wall 57 and the outer side wall 58 and extending in the vehicle width direction. It should be noted that the sixth upper wall 46a of the sixth closed cross-sectional portion 46 and the first lower wall 41b of the first closed cross-sectional portion 41 are the same portion. That is, the first closed cross-sectional portion 41 and the sixth closed cross-sectional portion 46 share the first lower wall 41b (that is, the sixth upper wall 46a). The sixth lower wall 46b includes a flange portion 46c extending inward in the vehicle width direction beyond the inner side wall 57.

A plurality of cross members 32 extending in the vehicle width direction are provided below the battery unit 10. The cross member 32 is disposed in the vehicle width direction of the battery unit 10 along the lower surface of the battery unit 10.

The lower side extending portion 40B is joined to the cross member 32 at the flange portion 46c. The bolt 60 extends in the vehicle vertical direction, penetrates the sixth lower wall 46b, the sixth upper wall 46a (first lower wall 41b), the first upper wall 41a, the flange portion 13b of the upper case 13, the flange portion 14b of the lower case 14, and the floor panel 30, and joins them.

According to the side sill reinforcement structure for an electric vehicle of the present embodiment, when a side collision load is applied to the first closed cross-sectional portion 41, the load can be transmitted to the cross member 32 through the lower side extending portion 40B. Therefore, higher battery protection performance can be secured.

Figure 6:
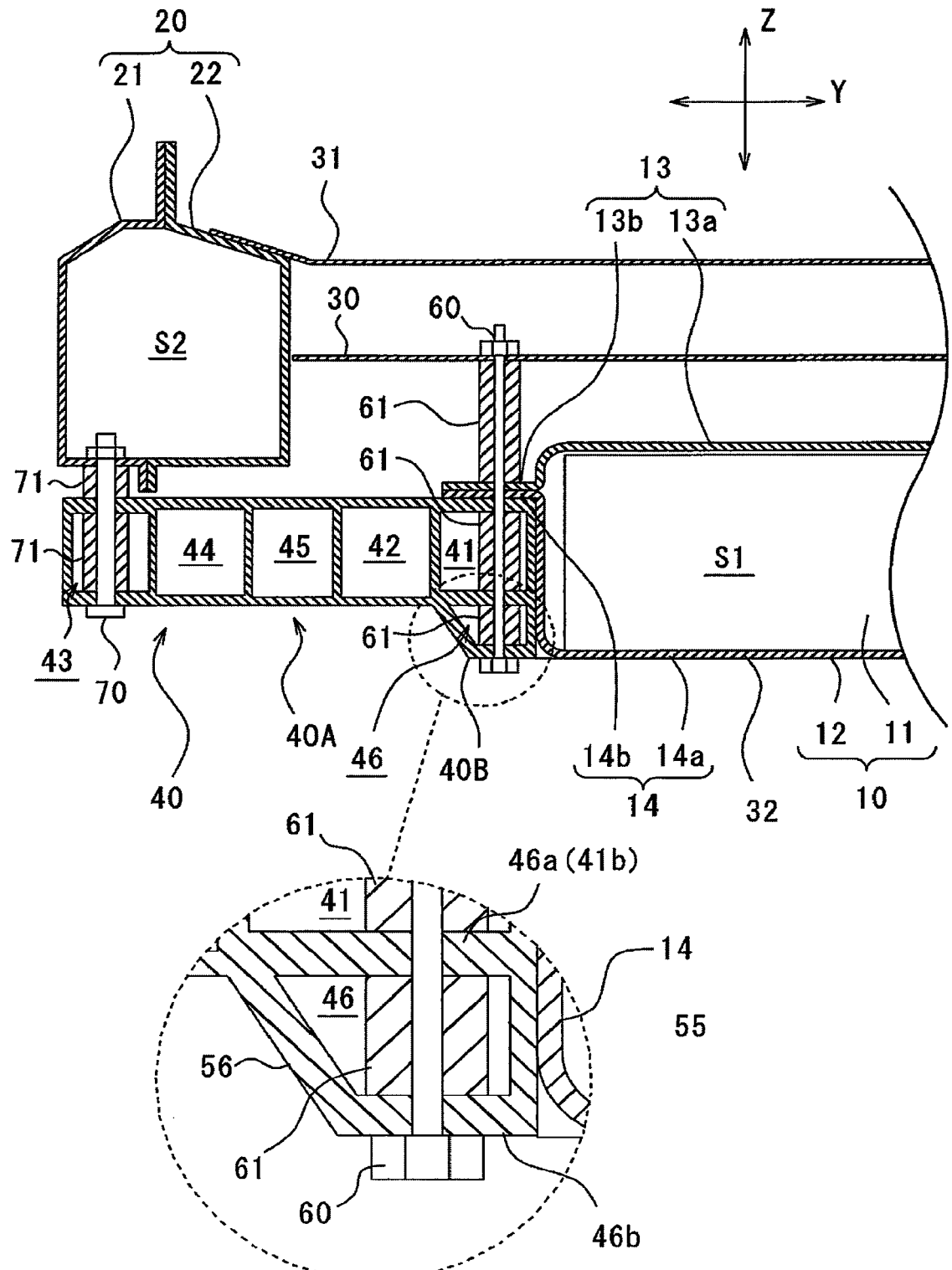
FIG. 6 is a cross-sectional view of a side sill reinforcement structure for an electric vehicle according to a first modification of the third embodiment.

A first modification of the third embodiment will be described with reference to FIG. 6. It should be noted that in FIG. 6, a portion indicated by a broken line circle is shown in an enlarged manner.

In a cross section perpendicular to the vehicle front-rear direction, the shape of the sixth closed cross-sectional portion 46 of the lower side extending portion 40B is not limited to a rectangle, and may be, for example, a trapezoid. In the example of FIG. 6, the inner side wall 57 is disposed along the vehicle vertical direction, but the outer side wall 58 is disposed to be inclined from the vehicle vertical direction.

In addition, the lower side extending portion 40B does not need to be joined to the cross member 32 (see FIG. 5). As shown in the example in FIG. 6, when the battery unit 10 is sufficiently large in the vehicle vertical direction, the first closed cross-sectional portion 41 and the sixth closed cross-sectional portion 46 may be disposed to abut on the battery unit 10. In this case, the deformation is suppressed by transmitting the side collision load to the bottom plate constituting the battery unit 10 rather than the cross member 32.

A second modification of the third embodiment will be described with reference to FIG. 7.

In the cross section perpendicular to the vehicle front-rear direction, the lower side extending portion 40B (see FIGS. 5 and 6) does not need to be provided in order to be joined to the cross member 32. For example, the first closed cross-sectional portion 41 may be joined to the cross member 32.

Figure 7:
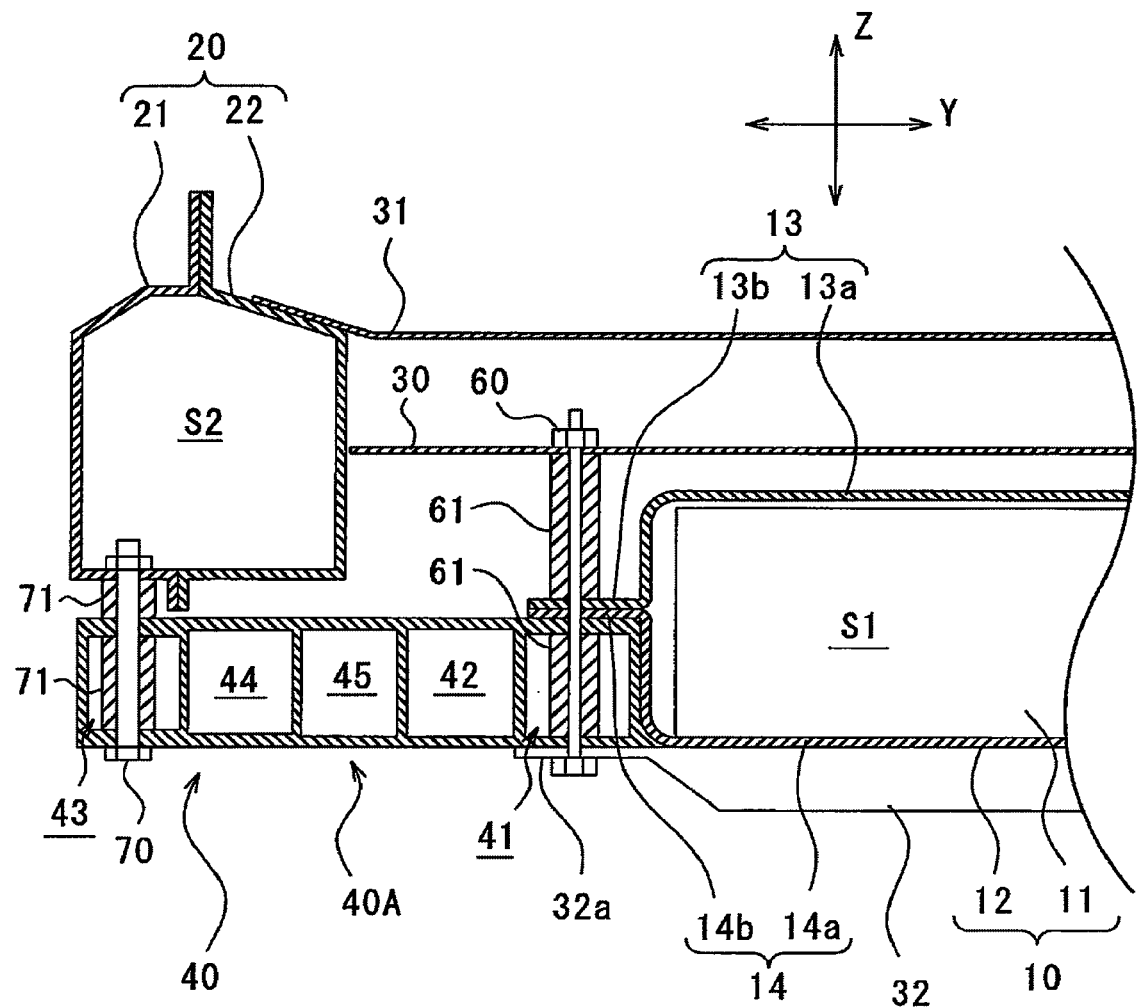
FIG. 7 is a cross-sectional view of a side sill reinforcement structure for an electric vehicle according to a second modification of the third embodiment.

In the example in FIG. 7, the end portion 32a on the outer side in the vehicle width direction of the cross member 32 is crushed. The end portion 32a is joined to the first closed cross-sectional portion 41 by a bolt 60. The bolt 60 extends in the vehicle vertical direction, penetrates the end portion 32a of the cross member 32, the first lower wall 41b, the first upper wall 41a, the flange portion 13b of the upper case 13, the flange portion 14b of the lower case 14, and the floor panel 30, and joins them.

In addition, although not shown in detail, when a cross member is disposed in the battery case 12, the reinforcing member 40 may be disposed on an outer side in the vehicle width direction of the cross member so that a side collision load can be transmitted from the reinforcing member 40 to the cross member.

Fourth Embodiment

Figure 8:
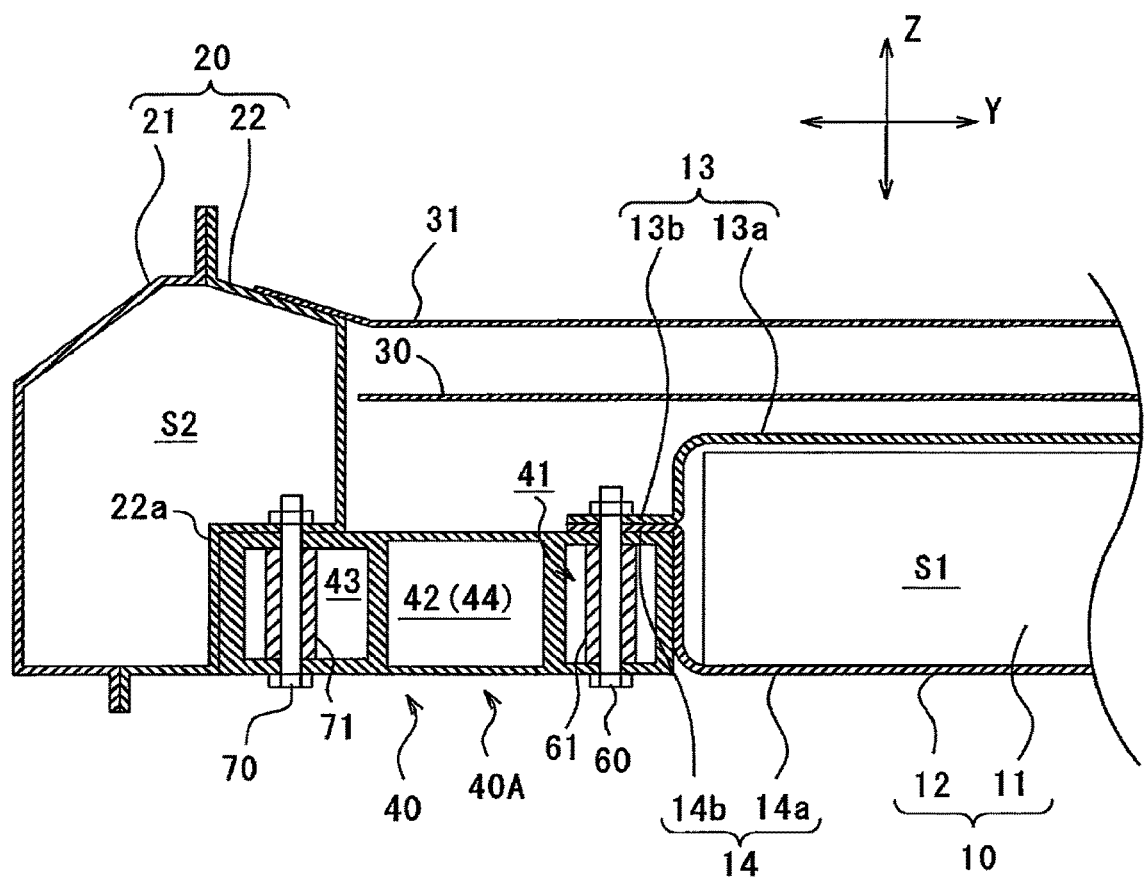
FIG. 8 is a cross-sectional view of a side sill reinforcement structure for an electric vehicle according to a fourth embodiment.
Figure 9:
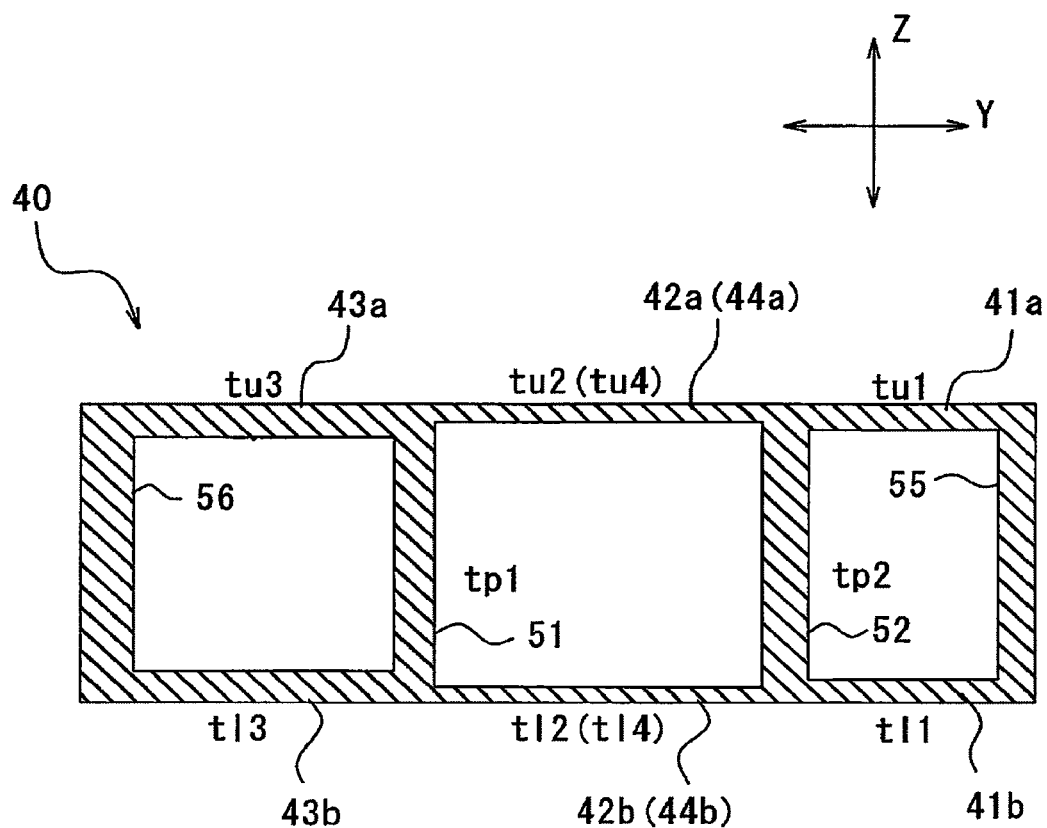
FIG. 9 is a cross-sectional view of the reinforcing member in FIG. 8.

The side sill reinforcement structure for an electric vehicle of the fourth embodiment shown in FIGS. 8 and 9 is substantially the same as that of the first embodiment except for the configuration related to the shape and arrangement of the reinforcing member 40 and the shape of the side sill Therefore, the description of portions the same as those of the first embodiment may be omitted.

In the present embodiment, the reinforcing member 40 is disposed on an inner side in the vehicle width direction of the side sill 20, and is joined to the inner member 22 of the side sill 20 by a bolt 70. The inner member 22 includes a step portion 22*a* having a shape complementary to that of the reinforcing member 40, and the reinforcing member 40 is disposed in the step portion 22*a*.

As described above, the arrangement of the reinforcing member 40 is not limited to below the side sill 20 as in the first to third embodiments, and may be on the inner side in the vehicle width direction of the side sill 20. That is, the reinforcing member 40 may be disposed so as to connect the side sill 20 and the battery unit 10 in any mode.

In addition, in the present embodiment, the closed cross-sectional portion group 40A of the reinforcing member 40 includes three rectangular closed cross-sectional portions 41 to 43 (44). As compared with the first embodiment, the fifth closed cross-sectional portion 45 (see FIG. 2) is omitted, and the second closed cross-sectional portion 42 (see FIG. 2) and the fourth closed cross-sectional portion 44 (see FIG. 2) are integrated. Therefore, the closed cross-sectional portion group 40A of the reinforcing member 40 includes a first closed cross-sectional portion 41 disposed on the innermost side in the vehicle width direction, a third closed cross-sectional portion 43 disposed on the outermost side in the vehicle width direction, and a second closed cross-sectional portion 42 (that is, the fourth closed cross-sectional portion 44) disposed between the first closed cross-sectional portion 41 and the third closed cross-sectional portion 43.

The first to third closed cross-sectional portions 41 to 43 are partitioned by two partition walls 51 to 52 extending in the vehicle vertical direction. The third closed cross-sectional portion 43 and the second closed cross-sectional portion 42 share the partition wall 51. The second closed cross-sectional portion 42 and the first closed cross-sectional portion 41 share the partition wall 52.

The first closed cross-sectional portion 41 is joined to the battery unit 10 by a bolt 60. The bolt 60 extends in the vehicle vertical direction, penetrates the first upper wall 41*a*, the first lower wall 41*b*, the flange portion 13*b* of the upper case 13, and the flange portion 14*b* of the lower case 14, and joins them.

As described above, the third closed cross-sectional portion 43 is joined to the inner member 22 of the side sill 20 by the bolt 70. The bolt 70 extends in the vehicle vertical direction, penetrates the third upper wall 43*a*, the third lower wall 43*b*, and the step portion 22*a* of the inner member 22, terminates in the internal space S2, and joins them.

The relative relationship between the thicknesses of the respective walls constituting the first closed cross-sectional portion 41, the second closed cross-sectional portion 42 (that is, the fourth closed cross-sectional portion 44), and the third closed cross-sectional portion 43 is the same as that of the first embodiment.

As described above, the number of closed cross-sectional portions included in the reinforcing member 40 is not particularly limited, and may be 5 as in the first embodiment, may be 3 as in the fourth embodiment, or may be 4 or 6 or more.

As described above, although the specific embodiments and their modifications of the present invention are described, the present invention is not limited to the above-described embodiments, and can be implemented with various modifications within the scope of the present invention. For example, an appropriate combination of contents of the individual embodiments and modifications may be one embodiment of the present invention.

In addition, the shape of each closed cross-sectional portion of the reinforcing member 40 is not limited to a rectangle or a trapezoid as in each of the above embodiments, and may be any polygon (for example, a hexagon or the like) having an upper wall and a lower wall facing each other.

The invention claimed is:

1. A side sill reinforcement structure for an electric vehicle comprising:
    a battery unit for drive disposed in a vehicle interior lower portion of an electric vehicle;
    a side sill extending in a vehicle front-rear direction on an outer side in a vehicle width direction of the battery unit; and
    a reinforcing member configured to connect the battery unit and the side sill,
    wherein the reinforcing member is an extruded material made of an aluminum alloy, and includes a closed cross-sectional portion group in which a plurality of closed cross-sectional portions are continuous in the vehicle width direction in a cross section perpendicular to the vehicle front-rear direction,
    wherein the closed cross-sectional portion group includes a first closed cross-sectional portion disposed on an innermost side in the vehicle width direction and a second closed cross-sectional portion disposed adjacent to the first closed cross-sectional portion,
    wherein the first closed cross-sectional portion includes a first upper wall and a first lower wall that extend in the vehicle width direction and are arranged to face each other while being separated from each other in a vehicle vertical direction,
    wherein the second closed cross-sectional portion includes a second upper wall and a second lower wall that extend in the vehicle width direction and are arranged to face each other while being separated from each other in the vehicle vertical direction, and
    wherein a thickness of the first upper wall is larger than a thickness of the second upper wall, and a thickness of the first lower wall is larger than a thickness of the second lower wall.

2. The side sill reinforcement structure for an electric vehicle according to claim 1, wherein a thickness of the first upper wall is 1.2 times or more a thickness of the second upper wall, and a thickness of the first lower wall is 1.2 times or more a thickness of the second lower wall.

3. The side sill reinforcement structure for an electric vehicle according to claim 1, wherein the first closed cross-sectional portion is joined to the battery unit by a bolt.

4. The side sill reinforcement structure for an electric vehicle according to claim 1,
    wherein the closed cross-sectional portion group includes a third closed cross-sectional portion disposed on an outermost side in the vehicle width direction and a fourth closed cross-sectional portion disposed on an inner side in the vehicle width direction adjacent to the third closed cross-sectional portion,
    wherein the third closed cross-sectional portion includes a third upper wall and a third lower wall that extend in the vehicle width direction and are arranged to face each other while being separated from each other in the vehicle vertical direction, wherein the fourth closed cross-sectional portion includes a fourth upper wall and a fourth lower wall that extend in the vehicle width direction and are arranged to face each other while being separated from each other in the vehicle vertical direction, and wherein a thickness of the third upper wall is larger than a thickness of the fourth upper wall, and a thickness of the third lower wall is larger than a thickness of the fourth lower wall.

5. The side sill reinforcement structure for an electric vehicle according to claim 4, wherein a thickness of the first upper wall is smaller than a thickness of the third upper wall, and a thickness of the first lower wall is smaller than a thickness of the third lower wall.

6. The side sill reinforcement structure for an electric vehicle according to claim 4, wherein the third closed cross-sectional portion is joined to the side sill by a bolt.

7. The side sill reinforcement structure for an electric vehicle according to claim 1,
wherein each closed cross-sectional portion included in the closed cross-sectional portion group includes an upper wall and a lower wall that extend in the vehicle width direction and are arranged to face each other while being separated from each other in the vehicle vertical direction, and
wherein thicknesses of the upper wall and the lower wall are sequentially decreased from an outer side to an inner side in the vehicle width direction excluding the first closed cross-sectional portion.

8. The side sill reinforcement structure for an electric vehicle according to claim 1,
wherein the reinforcing member includes a lower side extending portion extending downwards the battery unit,
wherein a cross member extending in the vehicle width direction is provided under the battery unit, and
wherein the lower side extending portion is joined to the cross member.

9. The side sill reinforcement structure for an electric vehicle according to claim 2, wherein the first closed cross-sectional portion is joined to the battery unit by a bolt.

10. The side sill reinforcement structure for an electric vehicle according to claim 2,
wherein the closed cross-sectional portion group includes a third closed cross-sectional portion disposed on an outermost side in the vehicle width direction and a fourth closed cross-sectional portion disposed on an inner side in the vehicle width direction adjacent to the third closed cross-sectional portion,
wherein the third closed cross-sectional portion includes a third upper wall and a third lower wall that extend in the vehicle width direction and are arranged to face each other while being separated from each other in the vehicle vertical direction,
wherein the fourth closed cross-sectional portion includes a fourth upper wall and a fourth lower wall that extend in the vehicle width direction and are arranged to face each other while being separated from each other in the vehicle vertical direction, and
wherein a thickness of the third upper wall is larger than a thickness of the fourth upper wall, and a thickness of the third lower wall is larger than a thickness of the fourth lower wall.

11. The side sill reinforcement structure for an electric vehicle according to claim 10, wherein a thickness of the first upper wall is smaller than a thickness of the third upper wall, and a thickness of the first lower wall is smaller than a thickness of the third lower wall.

12. The side sill reinforcement structure for an electric vehicle according to claim 10, wherein the third closed cross-sectional portion is joined to the side sill by a bolt.

13. The side sill reinforcement structure for an electric vehicle according to claim 2,
wherein each closed cross-sectional portion included in the closed cross-sectional portion group includes an upper wall and a lower wall that extend in the vehicle width direction and are arranged to face each other while being separated from each other in the vehicle vertical direction, and
wherein thicknesses of the upper wall and the lower wall are sequentially decreased from an outer side to an inner side in the vehicle width direction excluding the first closed cross-sectional portion.

14. The side sill reinforcement structure for an electric vehicle according to claim 10,
wherein each closed cross-sectional portion included in the closed cross-sectional portion group includes an upper wall and a lower wall that extend in the vehicle width direction and are arranged to face each other while being separated from each other in the vehicle vertical direction, and
wherein thicknesses of the upper wall and the lower wall are sequentially decreased from an outer side to an inner side in the vehicle width direction excluding the first closed cross-sectional portion.

15. The side sill reinforcement structure for an electric vehicle according to claim 11,
wherein each closed cross-sectional portion included in the closed cross-sectional portion group includes an upper wall and a lower wall that extend in the vehicle width direction and are arranged to face each other while being separated from each other in the vehicle vertical direction, and
wherein thicknesses of the upper wall and the lower wall are sequentially decreased from an outer side to an inner side in the vehicle width direction excluding the first closed cross-sectional portion.

16. The side sill reinforcement structure for an electric vehicle according to claim 2,
wherein the reinforcing member includes a lower side extending portion extending downwards the battery unit,
wherein a cross member extending in the vehicle width direction is provided under the battery unit, and
wherein the lower side extending portion is joined to the cross member.

* * * * *